United States Patent Office 3,135,744
Patented June 2, 1964

3,135,744
CYCLOALKENYL ETHERS OF 17β-HYDROXY ANDROSTANES
Alberto Ercoli, Milan, and Rinaldo Gardi, Carate, Brianza, Italy, assignors to Francesco Vismara S.p.A., Casatenovo (Como), Italy, a corporation of Italy
No Drawing. Filed Apr. 3, 1962, Ser. No. 184,680
Claims priority, application Italy Apr. 12, 1961
13 Claims. (Cl. 260—239.55)

The invention relates to 17-(1'-cycloalkenyl) ethers of 17β-hydroxy steroids of the androstane series. More specifically, the new compounds of this invention may be represented by the following structural formula:

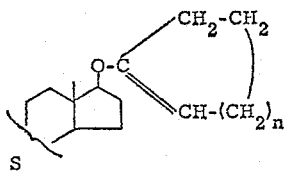

wherein $n$ is one of the integers 1 and 2 and S is selected from the group consisting of (a)

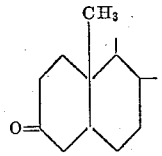

$\Delta^1, \Delta^4, \Delta^{1,4}, \Delta^{4,6}$-dehydro analogs thereof, the 9α-fluoro-11β-ol-derivatives of the Δ⁴-dehydro analogs, the 11β-ol-derivatives of the Δ4-dehydro analogs and the 11-one derivatives of the Δ⁴-dehydro analogs, (b)

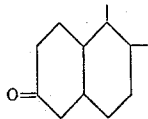

and $\Delta^4, \Delta^{5(10)}, \Delta^{5(6)}$-dehydro analogs thereof, (c)

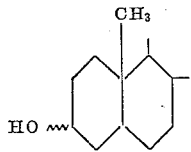

$\Delta^1, \Delta^4, \Delta^{1,4}, \Delta^{5(6)}$-dehydro analogs thereof, and lower alkyl ethers and lower alkanoyl esters of said compounds having the grouping (c) and the dehydro analogs thereof, (d)

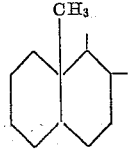

$\Delta^2, \Delta^4, \Delta^{3,5}$-dehydro analogs thereof, and 19-nor-Δ⁴-dehydro analog thereof, (e)

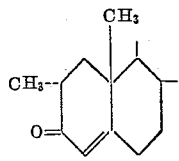

(f)

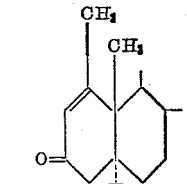

(g)

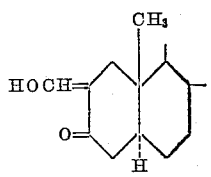

and (h)

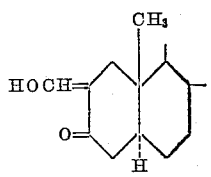

The term "lower alkyl" as used herein includes saturated lower hydrocarbon radicals containing from 1 to 5 carbon atoms, inclusive, preferably methyl, ethyl, propyl, isopropyl, amyl and cyclopentyl. The term "lower alkanoyl" means the acyl residue of an alkanoic acid containing from 1 to 3 carbon atoms, inclusive.

The new androstane derivatives of this invention, characterized by having at the 17β-position an oxycycloalkenyl moiety of the structure above indicated, possess valuable biological properties. They have antitesticular, antisteatogenic, antiovulatory effects and particularly pronounced androgenic and/or anabolic activity.

Preferred compounds of this invention are cyclopentenyl ethers of the 17β-hydroxy androstane series more particularly the 17-cyclopentenyl ethers of: 5α-androstane-17β-ol-3-one, 5α-androstane-3α,17β-diol, Δ⁴-androstene-17β-ol-3-one, Δ⁴-androstene-3β,17β-diol, Δ¹-androstene-17β-ol-3-one, Δ¹,⁴-androstadiene-17β-ol-3-one, 19-nor-Δ⁴-androstene-17β-ol-3-one, 19-nor-Δ⁵⁽¹⁰⁾-androstene-17β-ol-3-one and 9α-fluoro-Δ⁴-androstene-11β,17β-diol-3-one.

These compounds show a remarkable androgenic and/or anabolic activity. For instance, the cyclopentenyl ethers of the first four 17β-hydroxy androstanes, above mentioned, have proved to be orally as potent as methyltestosterone and the cyclopentenyl ether of Δ¹-androstene-17β-ol-3-one exhibits by oral route three times the anabolic activity and two times the androgenic activity of methyltestosterone itself.

Moreover the cyclopentenyl ethers of 19-nor-Δ⁴-androstene-17β-ol-3-one and 19-nor-Δ⁵⁽¹⁰⁾-androstene-17β-ol-3-one show a ratio of anabolic to androgenic activity 14 and 10 times respectively superior to that of methyltestosterone.

Generally the new cyclopentenyl ethers of the 17β-hydroxy androstanes of this invention show an increased biological activity over the corresponding free hydroxy parent steroids and are of greater value as androgenic and/or anabolic agents as compared with other 17β-hydroxy steroids of biological significance, e.g. methyltestosterone, because the non-physiologically active methyl group is not present in the 17-position.

The new cycloalkenyl ethers of this invention are obtained by reacting at a temperature higher than 80° C. the corresponding 17β-hydroxy steroid of the androstane series with a functional derivative of a five-or-six membered cyclic ketone the 3-hydroxy group, if present, first being protected. The term "functional derivatives" means the typical derivatives of the ketones with aliphatic alcohols, that is acetals, hemiacetals, enolethers, preferably dimethyl- or diethyl-acetals, methyl or ethyl enolethers or mixtures of these derivatives. Such functional derivatives can be prepared according to known methods, that is by heating cyclopentanone or cyclohexanone with the appropriate alkyl orthoformate.

A suitable functional derivative is a mixture of diethyl acetal and ethyl enol ether prepared by heating cyclopentanone or cyclohexanone with ethyl orthoformate and ethyl alcohol in the presence of an acid catalyst such as p-toluensulfonic acid.

The reaction between the functional derivative of cyclopentanone or cyclohexanone and the 17β-hydroxy steroid, can be performed either in the presence of suitable organic solvents or in their absence. The solvents which are most suitable to this purpose are those having a boiling point greater than 80° C., preferably benzene, toluene, dioxan, isoctane, and dimethylformamide. The reaction is carried out at a temperature in the range of from about 85° C. up to the boiling point of the solvent used and for from about 15 to 60 minutes. In the absence of the solvents, the reaction is preferably carried out at from about 90–190° C. for about 30 minutes to 2 hours.

The reaction can also be performed in the presence of an acid catalyst, preferably a strong organic acid or a salt of a strong acid with an organic base, for example p-toluensulfonic or benzenesulfonic acid or pyridine hydrochloride.

The desired 17-cycloalkenyl ether is obtained, after eliminating the solvent, if any, and removing the excess of cyclopentanone or cyclohexanone functional derivative reactant, by successive crystallizations in the usual manner.

If the resulting steroid derivative contains a keto group in the 3-position, it can be submitted, if desired, to a further step in order to transform the 3-keto group into a hydroxy group by normal reduction methods, for instance by treatment with lithium hydride or sodium borohydride.

Alternatively, the 17-cycloalkenyl ethers of 3,17β-dihydroxy androstanes can be obtained by reacting a 3-lower alkanoyl ester of the 3,17β-dihydroxy steroid with the functional derivative of cyclopentanone or cyclohexanone under the conditions above mentioned, the ester group at the 3-position can be hydrolyzed in an alkaline medium and under such conditions, the ether group at the 17-position is stable, thus providing the 17-cycloalkenyl ether of the 3,17β-hydroxy steroid.

The following examples are set forth as illustrating in detail the materials and methods for the preparation of the new compounds but they are not to be regarded as limiting the invention.

*Example 1*

150 cc. of cyclopentanone are heated to reflux for 1 hour with 285 cc. of ethyl orthoformate, 306 cc. of absolute ethanol and 1.425 g. of p-toluensulfonic acid. After cooling, the mixture is treated with 1.05 g. of potassium carbonate, filtered and distilled under reduced pressure, the fraction boiling at 68–71° C./20 mm. Hg being collected. To 10 cc. of the liquid product, consisting of a mixture of the diethyl-acetal and ethyl enol ether of cyclopentanone, there are added 5 g. of testosterone and the mixture is heated to 145° C. for 30 minutes. The temperature is then raised to 180–190° C. and heating is maintained while distilling to obtain a residue which is taken up with dilute methanol containing a few drops of pyridine. The crystalline product obtained on concentrating the solution under reduced pressure is purified by recrystallization from methanol to give 17-cyclopentenyl ether of testosterone, M. Pt. 128–130° C.; $[\alpha]_D = +100°$ (dioxan).

By substituting 9α-fluoro-11β-hydroxy testosterone for testosterone in the above reaction, the 17-cyclopentenyl ether of 9α-fluoro-11β-hydroxy testosterone is obtained, M. Pt. 200–204° C.; $[\alpha]_D = +93°$ (dioxan).

Similarly, the 17-cyclopentenyl ether of 11β-hydroxy-testosterone and the cyclopentenyl ether of 11-keto-testosterone are prepared.

*Example 2*

3 g. of 2α-methyltestosterone in 5 cc. of dimethylformamide are treated with 30 mg. of p-toluensulfonic acid and 5 cc. of cyclopentanone diethylacetal (obtained by treating cyclopentanone with orthoformic ether and dry ethanol according to the method described in Rec. Trav. Chim. 57, 136; 1938).

The mixture is heated for 30 minutes at 180–190° C., then cooled and neutralized with a few drops of pyridine. After distillation under reduced pressure, there is obtained a residue which is taken up with a mixture of methylene chloride-methanol. The product which separates on cooling consists of 17-cyclopentenyl ether of 2α-methyltestosterone, M. Pt. 154–155° C.; $[\alpha]_D = +105°$ (dioxan).

*Example 3*

A mixture of 3 g. of $\Delta^{1,4}$-androstadiene-17β-ol-3-one, 5 cc. of cyclopentanone diethyl-acetal, 400 cc. of isoctane and 40 mg. of p-toluensulfonic acid is heated under reflux for 10 minutes and then the solvent is completely removed by distillation under reduced pressure.

The residue is taken up with 10 cc. of methanol containing a few drops of pyridine, the solution is filtered and the solvent evaporated. The product, recrystallized from dilute methanol, consists of 17-cyclopentenyl ether of $\Delta^{1,4}$-androstadiene-17β-ol-3-one, M. Pt. 133–134. 5° C.; $[\alpha]_D = +60°$ (dioxan).

*Example 4*

By treating a mixture of $\Delta^{4,6}$-androstadiene-17β-ol-3-one (2 g.), cyclopentanone diethyl-acetal (4 cc.) and p-toluensulfonic acid (30 mg.) in 250 cc. of isoctane as in the foregoing Example, the 17-cyclopentenyl ether of $\Delta^{4,6}$-androstadiene-17β-ol-3-one is obtained; M. Pt. 142–144° C.; $[\alpha]_D = +23°$ (dioxan).

*Example 5*

3 g. of $\Delta^1$-androstene-17β-ol-3-one in 5 cc. of dimethylformamide solution are treated with 5 cc. of cyclopentanone diethyl-acetal and 30 mg. of benzensulfonic acid. The mixture is heated at 180° C. for about 1 hour, then cooled and neutralized with a few drops of pyridine and the solvent distilled under vacuum. The residue is purified with dilute methanol to give 17-cyclopentenyl ether of $\Delta^1$-androstene-17β-ol-3-one, M. Pt. 118–120° C.; $[\alpha]_D = +60°$ (dioxan).

*Example 6*

3 g. of 19-nortestosterone are treated with 10 cc. of a mixture of diethyl-acetal and ethyl enol ether of cyclopentanone as in Example 1 to give 17-cyclopentenyl ether of 19-nortestosterone, M. Pt. 102–106° C.; $[\alpha]_D = +50°$ (dioxan).

*Example 7*

A mixture of 1.5 g. of 5α-androstane-17β-ol-3-one and 5 cc. of dimethylformamide is treated with 3 cc. of cyclopentanone diethyl-acetal and 30 mg. of sulfosalicylic acid. The mixture heated for 30 minutes at 180–190° C., then distilled under reduced pressure after addition of a few drops of pyridine. The residue is purified with boiling dilute methanol to give 17-cyclopentenyl ether of 5α-androstane-17β-ol-3-one, M. Pt. 100–102° C.; $[\alpha]_D = +59°$ (dioxan).

Example 8

3 g. of 2-hydroxy methylene-5α-androstane-17β-ol-3-one in 5 cc. of dimethylformamide solution are reacted with 10 cc. of cyclopentanone dimethyl-acetal and 30 mg. of p-toluensulfonic acid. The reaction mixture is heated at 190° C. for about 1 hour, then neutralized with a few drops of pyridine and concentrated to dryness under reduced pressure. The residue, crystallized twice from methanol, yields 17-cyclopentenyl ether of 2-hydroxy-methylene-5α-androstane-17β-ol-3-one; M. Pt. 168–173° C.; $[\alpha]_D = +58°$ (dioxan).

Example 9

5 g. of 5α-androstane-3α,17β-diol-3-acetate (obtained by reduction of the corresponding 17-keto derivative with sodium borohydride) in dimethylformamide solution are treated with 10 cc. of cyclopentanone diethylacetal as in Example 2 to give the corresponding 17-cyclopentenyl ether melting at 134–136° C.; $[\alpha]_D = +32°$ (dioxan).

This product (1.5 g.), dissolved in 50 cc. of methanol, is treated under reflux for 2 hours with a solution of 0.5 g. of potassium carbonate in 5 cc. of water. The reaction mixture gives upon concentration a residue which, purified with methanol, consists of 17-cyclopentenyl ether of 5α-androstane-3α,17β-diol, M. Pt. 145–147° C.; $[\alpha]_D = +30°$ (dioxan).

The same product is obtained by alkaline hydrolysis of 17-cyclopentenyl ether of 5α-androstane-3α,17β-diol-3-propionate, M. Pt. 91–92° C.; $[\alpha]_D = +35°$ (dioxan).

Example 10

By treating 5α-androstane-3α,17β-diol-3-n-butyl ether with cyclopentanone diethyl-acetal as in Example 2, the corresponding 17-cyclopentenyl ether is obtained, M. Pt. 121–122° C.; $[\alpha]_D = +19.4°$ (dioxan).

Similarly, 17-cyclopentenyl ether of 5α-androstane-3α,17β-diol-3-isopropyl ether is prepared, M Pt. 54–58° C.; $[\alpha]_D = +24°$ (dioxan).

Example 11

2 g. of $\Delta^{5(6)}$-androstene-3β,17β-diol 3-propionate (obtained by sodium borohydride reduction of the corresponding 17-keto derivative) are treated with 5 cc. of cyclopentanone diethylacetal, 8 cc. of dimethylformamide and 40 mg. of p-benzensulfonic acid. The mixture is heated for 30 minutes at 180–190° C., then neutralized with a few drops of pyridine and concentrated to dryness under reduced pressure. The residue, taken up with methanol, filtered and recrystallized from methanol, yields 1 g. of 17-cyclopentenyl ether of $\Delta^{5(6)}$-androstene-3β,17β-diol-3-propionate, M. Pt. 77–79° C.; $[\alpha]_D = -34.5°$ (dioxan).

This product, dissolved in 30 cc. of methanol, is heated under reflux for two hours with 0.6 g. of sodium carbonate in 5 cc. of water solution. By concentrating the solution to dryness and purifying the residue from methanol, there is obtained 17-cyclopentenyl ether of $\Delta^{5(6)}$-androstene-3β,17β-diol, M. Pt. 115–117° C.; $[\alpha]_D = -32°$ (dioxan).

The same product is obtained by alkaline hydrolysis of 17-cyclopentenyl ether of $\Delta^{5(6)}$-androstene-3β,17β-diol-3-acetate.

Example 12

By operating according to the technique described in Example 11, 17-cyclopentenyl ether of $\Delta^{5(6)}$-androstene-3β,17β-diol-3-isopropyl ether is obtained, M. Pt. 139–140° C.; $[\alpha]_D = -29.8°$ (dioxan).

Example 13

$\Delta^4$-androstene-3α,17β-diol-3-acetate is treated with cyclopentanone diethyl-acetal and ethyl enol ether as in Example 1 to give 17-cyclopentenyl ether of $\Delta^4$-androstene-3α,17β-diol 3-acetate. The product, hydrolyzed with sodium carbonate in methanol solution as in Example 11, yields the corresponding 17-cyclopentenyl ether of $\Delta^4$-androstene-3α,17β-diol.

In the same manner, 17-cyclopentenyl ether of $\Delta^{1,4}$-androstadiene-3α,17β-diol-3-acetate is obtained and converted on alkaline hydrolysis to 17-cyclopentenyl ether of $\Delta^{1,4}$-androstadiene-3α,17β-diol.

Example 14

A mixture of 4 g. of $\Delta^1$-androstene-3α,17β-diol-3-acetate, 8 cc. of cyclopentanone diethyl-acetal, 400 cc. of toluene and 50 mg. of pyridine hydrochloride is heated to reflux and distilled for about 15 minutes. The remaining solution is then concentrated to dryness in vacuo. The residue, purified from dilute methanol, yields the 17-cyclopentenyl ether of $\Delta^1$-androstene-3α,17β-diol-3-acetate. Hydrolysis of the product with potassium carbonate in dilute methanol provides the 17-cyclopentenyl ether of $\Delta^1$-androstene-3α,17β-diol.

Example 15

2 g. of 17-cyclopentenyl ether of testosterone, obtained as described in Example 1, are dissolved in 150 cc. of ether and the solution refluxed for 1 hour with 3 g. of lithium aluminium hydride in 40 cc. of anhydrous ether. After careful addition of water, the mixture is extracted with ether and the ethereal extracts collected and dried over anhydrous sodium sulfate. Evaporation of the solvent gives a solid residue which crystallized from a mixture of methylene chloride-methanol consists of the 17-cyclopentenyl ether of $\Delta^4$-androstene-3β,17β-diol, M. Pt. 153–155° C.; $[\alpha]_D = +54°$ (dioxan).

Analogously, 17-cyclopentenyl ether of $\Delta^{1,4}$-androstadiene-17β-ol-3-one, prepared according to the Example 3, is converted by treatment with lithium aluminium hydride to 17-cyclopentenyl ether of $\Delta^{1,4}$-androstadiene-3β,17β-diol.

Example 16

By treating cyclohexanone with ethyl orthoformate and dry ethanol in the presence of p-toluensulfonic acid (according to the method described in Rec. Trav. Chim. Pays Bas 57, 136; 1938) cyclohexanone diethyl acetal is obtained. 30 cc. of this product are added to a mixture of 8 g. of $\Delta^1$-androstene-17β-ol-3-one, 20 cc. of dimethylformamide and 50 mg. of p-toluensulfonic acid. The reaction mixture worked as in Example 5 provides the 17-cyclohexenyl product.

A solution of 1 g. of sodium borohydride in 50 cc. of water is added dropwise over 30 minutes to a stirred solution of 5 g. of 17-cyclohexenyl ether of $\Delta^1$-androstene-17β-ol-3-one in 200 cc. of dimethylformamide maintained at a temperature of 20° C. The mixture is then diluted with water and extracted with ether. The product obtained by evaporation of the ethereal extract, is purified from methanol to give 17-cyclohexenyl ether of $\Delta^1$-androstene-3β,17β-diol.

Example 17

A mixture of 2 g. of 19-nor-$\Delta^{5(10)}$-androstene-17β-ol-3-one, 5 cc. of cyclopentanone diethyl-acetal, 30 mg. of p-toluensulfonic acid and 15 cc. of dimethylformamide is heated for about 40 minutes at a temperature of 180° C. By operating as in Example 2, 17-cyclopentenyl ether of 19-nor-$\Delta^{5(10)}$-androstene-17β-ol-3-one is obtained, M. Pt. 152–154° C.; $[\alpha]_D = +163°$ (dioxan).

Example 18

A mixture of 3 g. of 5α-androstane-17β-ol[3,2c]-isoxazole (prepared by reacting 2-hydroxy-methylene-androstan-17β-ol-3-one with hydroxylamine hydrochloride according to the method described by Marchetti and Donini, Gazz. Chim. It. 91, 1133; 1961), 5 cc. of cyclopentanone diethyl-acetal, 400 cc. of isoctane and 40 mg. of p-toluensulfonic acid is worked as in Example 3, to give 17-cyclopentenyl ether of 5α-androstane-17β-ol-[3,2c]isoxazole, M. Pt. 126–128° C.; $[\alpha]_D = +64°$ (dioxan).

Example 19

By treating 5α-androstane-3α,17β-diol-3-propionate with cyclohexanone diethyl-acetal as in Example 7, there is obtained 17-cyclohexenyl ether of 5α-androstane-3α, 17β-diol-3-propionate, M. Pt. 138–139° C.; [α]$_D$=+37° (dioxan).

Hydrolysis with sodium carbonate provides the corresponding 17-cyclohexenyl ether of 5α-androstane-3α, 17β-diol.

Analogously the 17-cyclohexenyl ether of 3β-acetoxy-Δ$^{5(6)}$-androstene-17β-ol is obtained, M. Pt. 142–144° C.; [α]$_D$=−26.4° (dioxan) which, by hydrolysis with aqueous potassium carbonate, as described in Example 11 yields the 17-cyclohexenyl ether of Δ$^{5(6)}$-androstene-3β, 17β-diol, M. Pt. 152–155° C.; [α]$_D$=−19° (dioxan).

In the same manner are prepared:

5α-androstane-3β,17β-diol 17-cyclohexenyl ether,
Testosterone 17-cyclohexenyl ether,
19-nortestosterone 17-cyclohexenyl ether,
Δ$^{1,4}$-androstadiene-17β-ol-3-one 17-cyclohexenyl ether,
9α-fluoro-Δ$^4$-androstene-11β,17β-diol-3-one 17-cyclohexenyl ether,
2α-methyl-Δ$^4$-androstene-17β-ol-3-one 17-cyclohexenyl ether,
19-nor-Δ$^{5(6)}$-androstene-17β-ol-3-one 17-cyclohexenyl ether.

Example 20

1 g. of 1-methyl-Δ$^1$-androstene-17β-ol-3-one (obtained as described in Ber. 93, 1710; 1960), is treated with 3 cc. of cyclopentanone diethyl-acetal and 20 mg. of p-toluensulfonic acid in 200 cc. of isoctane as in Example 3 to give 17-cyclopentenyl ether of 1-methyl-Δ$^1$-androstene-17β-ol-3-one.

Similarly, 5α-androstane-17β-ol (prepared by Wolf-Kishner reaction of the semicarbazone of 17β-hydroxyandrostane-3-one according to Ruyle, J. Organic Chem. 25, 1260; 1960), is reacted and converted to 17-cyclopentenyl ether.

Example 21

1 g. of Δ$^4$-19-nor-androstene-17β-ol (obtained as described in Chem. and Ind. 905, 1959), is treated with 4 cc. of cyclopentanone diethyl-acetal and 25 mg. of p-toluensulfonic acid in 200 cc. of isoctane as illustrated in Example 3 to obtain the 17-cyclopentenyl ether of Δ$^4$-19-nor-androstene-17β-ol.

We claim:

1. A compound selected from the group consisting of a compound of the formula

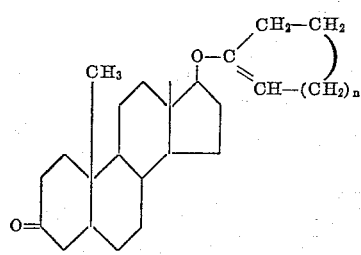

wherein $n$ is one of the integers 1 and 2, a 2-hydroxymethylene derivative thereof, a Δ$^1$-dehydro analog thereof, a 1-methyl derivative of said Δ$^1$-dehydro analog, a Δ$^4$-dehydro analog thereof, a 9α-fluoro-11β-ol derivative of said Δ$^4$-dehydro analog, an 11β-ol derivative of said Δ$^4$-dehydro analog, an 11-one derivative of said Δ$^4$-dehydro analog, a 2α-methyl derivative of said Δ$^4$-dehydro analog, a Δ$^{1,4}$-dehydro analog thereof, and a Δ$^{4,6}$-dehydro analog thereof.

2. A compound selected from the group consisting of a compound of the formula

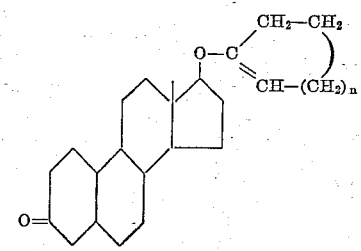

wherein $n$ is one of the integers 1 and 2, a Δ$^4$-dehydro analog thereof, a Δ$^{5(10)}$-dehydro analog thereof and a Δ$^{5,6}$-dehydro analog thereof.

3. A compound selected from the group consisting of a compound of the formula

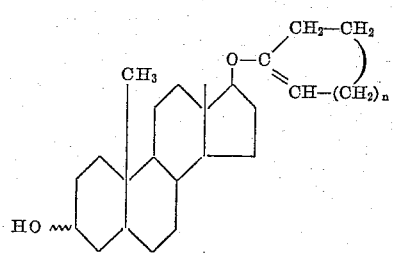

wherein $n$ is one of the integers 1 and 2, a 3-lower alkyl ether thereof, a 3-lower alkanoyl ester thereof, a Δ$^1$-dehydro analog thereof, a 3-lower alkyl ether of said Δ$^1$-dehydro analog, a 3-lower alkanoyl ester of said Δ$^1$-dehydro analog, a Δ$^4$-dehydro analog thereof, a 3-lower alkyl ether of said Δ$^4$-dehydro analog, a 3-lower alkanoyl ester of said Δ$^4$-dehydro analog, a Δ$^{1,4}$-dehydro analog thereof, a 3-lower alkyl ether of said Δ$^{1,4}$-dehydro analog, a 3-lower alkanoyl ester of said Δ$^{1,4}$-dehydro analog, a Δ$^{5,6}$-dehydro analog thereof, a 3-lower alkyl ether of said Δ$^{5,6}$-dehydro analog and a 3-lower alkanoyl ester of said Δ$^{5,6}$-dehydro analog.

4. A compound selected from the group consisting of a compound of the formula

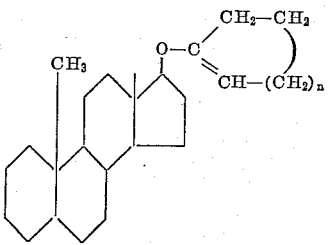

wherein $n$ is one of the integers 1 and 2, a [3,2c] isoxazole derivatives thereof, a Δ$^2$-dehydro analog thereof, a Δ$^4$-dehydro analog thereof, a Δ$^{3,5}$-dehydro analog thereof and a 19-nor-Δ$^4$-dehydro analog thereof.

5. 17-cyclopentenyl ether of 5α-androstane-17β-ol-3-one.

6. 17-cyclopentenyl ether of 5α-androstane-3α,17β-diol.

7. 17-cyclopentenyl ether of Δ$^4$-androstene-17β-ol-3-one.

8. 17-cyclopentenyl ether of Δ$^4$-androstene-3β,17β-diol.

9. 17-cyclopentenyl ether of Δ$^1$-androstene-17β-ol-3-one.

10. 17-cyclopentenyl ether of $\Delta^{1,4}$-androstadiene-17β-ol-3-one.

11. 17-cyclopentenyl ether of 19-nor-$\Delta^4$-androstene-17β-ol-3-one.

12. 17-cyclopentenyl ether of 19-nor-$\Delta^{5(10)}$-androstene-17β-ol-3-one.

13. 17-cyclopentenyl ether of 9α-fluoro-$\Delta^4$-androstene-11β,17β-diol-3-one.

References Cited in the file of this patent

UNITED STATES PATENTS 2,846,452  Campbell _____ Aug. 5, 1958

FOREIGN PATENTS 812,690  Great Britain _____ Apr. 29, 1959

OTHER REFERENCES

Butenandt et al.: Berichte, vol. 73, pages 206–208, 1940.

Wilde et al.: J.A.C.S., vol. 75, pages 5366–5369, 1953.

Rosenkranz et al.: J.A.C.S., vol. 76, pages 5024–5026, 1954.

Huggins et al.: Endocrinology, vol. 57, pages 25–32, 1955.

Schering: Derwent Belgian Report No. 55A, page A25, June 30, 1959.